United States Patent
Chang et al.

(10) Patent No.: US 11,381,157 B1
(45) Date of Patent: Jul. 5, 2022

(54) MOTOR DRIVE AND METHOD FOR REDUCING DEAD BAND OF MOTOR DRIVE

(71) Applicant: Industrial Technology Research Institute, Hsin-Chu (TW)

(72) Inventors: Cheng-Min Chang, Hsinchu County (TW); Chun-Chieh Chang, Taipei (TW); Hsi-Chih Chang, Hsinchu (TW); Po-Huan Chou, Hsinchu County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 17/117,246

(22) Filed: Dec. 10, 2020

(51) Int. Cl.
*H02M 1/38* (2007.01)
*H02M 3/158* (2006.01)

(52) U.S. Cl.
CPC ......... *H02M 1/385* (2021.05); *H02M 3/1588* (2013.01)

(58) Field of Classification Search
CPC .......................... H02M 1/385; H02M 3/1588
See application file for complete search history.

(56) References Cited

U.S. PATENT DOCUMENTS

| | | | |
|---|---|---|---|
| 10,673,337 B1* | 6/2020 | Jodka | H02M 1/088 |
| 2008/0022139 A1* | 1/2008 | Lin | H02M 3/1588 713/320 |
| 2012/0200273 A1* | 8/2012 | Eom | H02M 3/1588 323/271 |
| 2015/0061639 A1 | 3/2015 | Webster et al. | |
| 2015/0162857 A1 | 6/2015 | Ohta et al. | |
| 2019/0207511 A1 | 7/2019 | Ordasi | |
| 2020/0091854 A1 | 3/2020 | Tatewaki | |

FOREIGN PATENT DOCUMENTS

| CN | 104006157 | | 8/2014 |
|---|---|---|---|
| CN | 106688183 | A | 5/2017 |
| CN | 107947538 | A | 4/2018 |
| CN | 108964498 | A | 12/2018 |

(Continued)

OTHER PUBLICATIONS

Akimasa Niwa et al., "A Dead-Time-Controlled Gate Driver Using Current-Sense FET Integrated in SiC MOSFET", Apr. 2018, pp. 3258-3267, vol. 33, No. 4, IEEE Transactions on Power Electronics.

(Continued)

*Primary Examiner* — Jue Zhang
(74) *Attorney, Agent, or Firm* — WPAT, PC

(57) ABSTRACT

A motor drive is provided, which includes a control circuit, a first transistor, a first comparison circuit, a second transistor and a load. The control circuit includes a first output terminal and a second output terminal; the first output terminal outputs a first control signal; the second output terminal outputs a second control signal whose phase is inverse to the phase of the first control signal. The gate of the first transistor receives the first control signal. The first comparison circuit compares the gate-source voltage with a reference voltage to generate a first comparison signal. When the first comparison signal shows that the first control signal is reduced to be lower than the reference voltage, the second control signal generated by the second output terminal is transmitted to the gate of the second transistor.

20 Claims, 7 Drawing Sheets

(56) References Cited

FOREIGN PATENT DOCUMENTS

| EP | 2882095 A1 | 6/2015 |
|---|---|---|
| JP | H11-98899 A | 4/1999 |
| TW | I321623 | 3/2010 |
| TW | I452826 | 9/2014 |
| TW | I458226 B | 10/2014 |
| TW | I462458 B | 11/2014 |
| TW | 202002499 | 1/2020 |

OTHER PUBLICATIONS

Rangarajan M. Tallam et al., "Common-Mode Voltage Reduction PWM Algorithm for AC Drives", 2009, p. 3660-3667, IEEE.
C. Deselaers et al., "Dead time optimization method for power converter", 2013. CC Attribution 3.0 License., pp. 231-236, Adv. Radio Sci., 11.
Anirudh Guha et al., "Impact of Dead Time on Inverter Input Current, DC-Link Dynamics, and Light-Load Instability in Rectifier-Inverter-Fed Induction Motor Drives", 2016, pp. 1249-1254, International Symposium on Power Electronics, Electrical Drives, Automation and Motion, IEEE.
Lazhar Ben-Brahim, "On the compensation of dead time and zero-current crossing for a PWMinverter-controlled AC servo drive", Oct. 2004, pp. 1113-1117, vol. 51, No. 5, IEEE Transactions on Industrial Electronics.
Yen-Shin Lai et al., "Optimal common-mode voltage reduction PWM technique for inverter control with consideration of the deadtime effects—part II: applications to IM drives with diode front end", Nov./Dec. 2004, pp. 1605-1612, vol. 40, No. 6, IEEE Transactions on Industry Applications.
TW OA dated Jan. 22, 2022.

\* cited by examiner

US 11,381,157 B1

MOTOR DRIVE AND METHOD FOR REDUCING DEAD BAND OF MOTOR DRIVE

TECHNICAL FIELD

The technical field relates to a motor drive. The technical field further relates to a method for reducing dead band of motor drive.

BACKGROUND

In general, a motor drive controls the upper-arm switch and the lower-arm switch therefore via a control circuit. Thus, the motor drive is usually provided with a mechanism "dead band" in order to avoid that the upper-arm switch and the lower-arm switch are damaged because being turned on at the same time.

Generally speaking, the dead band can be expressed by Equation (1) given below:

$$DT=T_{d1}+T_{d2} \quad (1)$$

In Equation (1), DT stands for the dead band; $T_{d1}$ stands for the maximal delay time of an isolation circuit (e.g. photo coupler); $T_{d2}$ stands for the maximal extension time from the switch being turned off to the current outputted by the switch being zero.

However, it is necessary to take many factors into consideration, such as stray inductance, capacitance or temperature, in order to provide the best dead band. If the dead band is too long, the loss of the load (e.g. free-wheeling diode) of the motor drive may increase, On the contrary, if the dead band is too short, the switches may be transitorily short-circuited, which may result in the increase of the loss of the switches.

Besides, as currently available motor drives cannot provide proper dead band, so the loss thereof cannot be effectively reduced, which may decrease the efficiency of these motor drives.

SUMMARY

An embodiment of the disclosure relates to a motor drive, which includes a control circuit, a first transistor, a first comparison circuit and a second transistor. The control circuit includes a first output terminal and a second output terminal. The first output terminal outputs a first control signal and the second output terminal outputs a second control signal; the phase of the first control signal is inverse to the phase of the second control signal. The first transistor receives the first control signal via the gate thereof. The first comparison circuit compares the gate-source voltage of the first transistor with a reference voltage to generate a first comparison signal. When the first comparison signal shows that the first control signal is reduced to be lower than the reference voltage, the second control signal outputted by the second output terminal is transmitted to the gate of the second transistor.

Another embodiment of the disclosure relates to a method for reducing dead band of motor drive, which includes the following steps: outputting a first control signal and a second control signal by a first output terminal and a second output terminal of a control circuit respectively, wherein the phase of the first control signal is inverse to the phase of the second control signal; receiving the first control signal by the gate of a first transistor; comparing the gate-source voltage of the first transistor with a reference voltage to generate a first comparison signal by a first comparison circuit; and transmitting the second control signal outputted by the second output terminal to the gate of a second transistor when the first comparison signal shows that the first control signal is reduced to be lower than the reference voltage.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
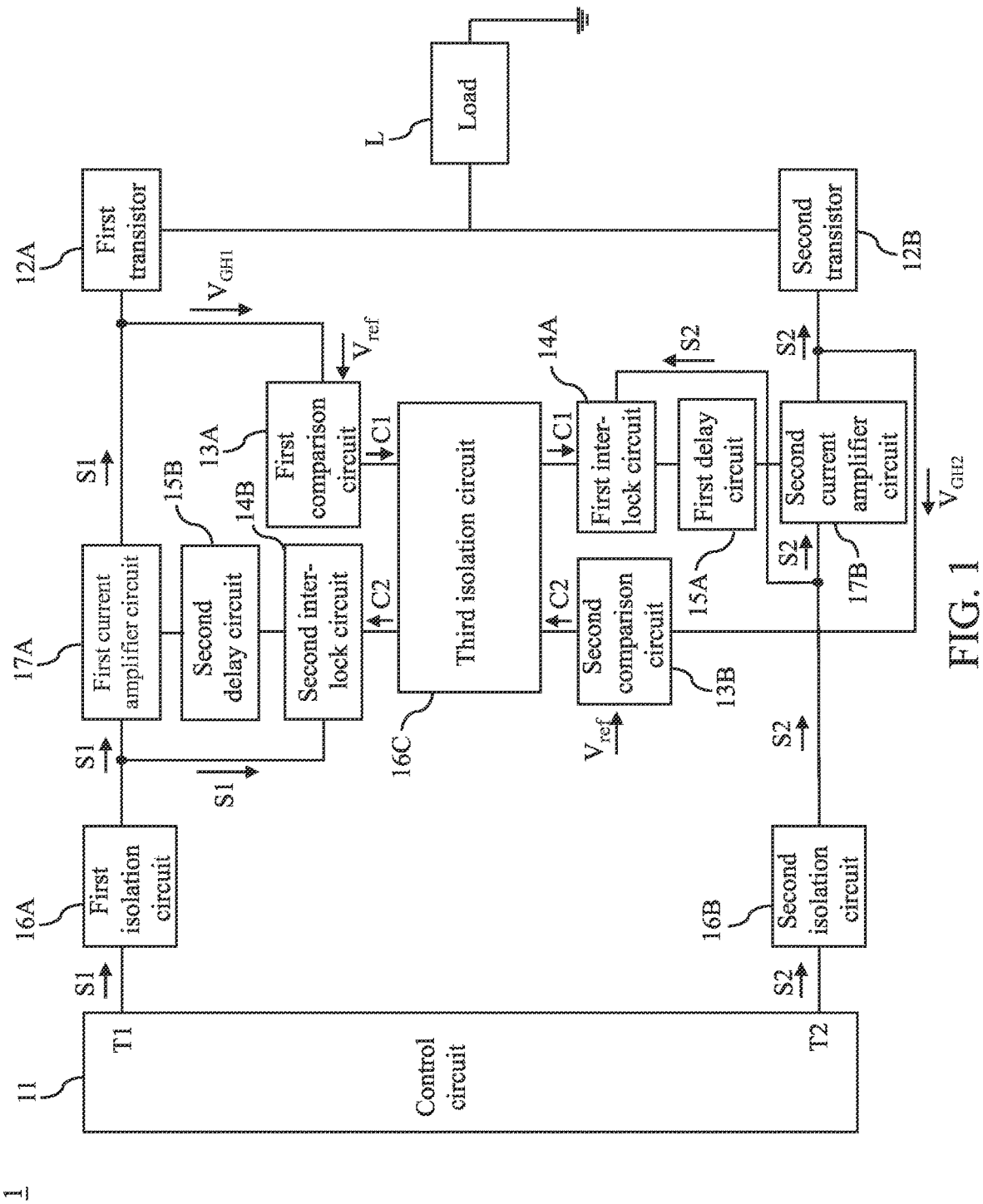
FIG. 1 is a block diagram of a motor drive in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a block diagram of a motor drive in accordance with a first embodiment of the disclosure. As shown in FIG. 1, the motor drive 1 of this embodiment includes a control circuit 11, a first transistor 12A, a second transistor 12B, a first comparison circuit 13A, a second comparison circuit 13B, a first inter-lock circuit 14A, a second inter-lock circuit 14B, a first delay circuit 15A, a second delay circuit 15B, a first isolation circuit 16A, a second isolation circuit 16B, a third isolation circuit 16C, a first current amplifier circuit 17A and a second current amplifier circuit 17B.

The control circuit 11 includes a first output terminal T1 and a second output terminal T2. The first output terminal T1 is coupled to the gate of the first transistor 12A via the first isolation circuit 16A and the first current amplifier circuit 17A. The first output terminal T1 outputs a first control signal S1, and the first control signal S1 is transmitted to the gate of the first transistor 12A via the first isolation circuit 16A and the first current amplifier circuit 17A. The second output terminal T2 is coupled to the gate of the second transistor 12B via the second isolation circuit 16B and the second current amplifier circuit 17B. The second output terminal T2 outputs a second control signal S2 whose phase is inverse to the phase of the first control signal S1, and the second control signal S2 is transmitted to the gate of the second transistor 12B via the second isolation circuit 16B and the second current amplifier circuit 17B. In one embodiment, the first transistor 12A and the second transistor 12B may be metal-oxide-semiconductor field-effect transistors (MOSFET), insulated gate bipolar transistors (IGBT) or other similar components. In one embodiment, the first control signal S1 and the second control signal S2 may be pulse-width modulation (PWM) signals or other similar signals.

The first comparison circuit 13A is coupled to the gate of the first transistor 12A, and compares the gate-source voltage $V_{GH1}$ of the first transistor 12A with a reference voltage $V_{ref}$ to generate a first comparison signal C1. In one embodiment, the first comparison circuit 13A may be a comparator or other similar components.

The first inter-lock circuit 14A is coupled to the second output terminal T2 via the second isolation circuit 16B. Besides, the first inter-lock circuit 14A is coupled to the first comparison circuit 13A via the third isolation circuit 16C, and is coupled to the second current amplifier circuit 17B via the first delay circuit 15A.

The second comparison circuit 13B is coupled to the gate of the second transistor 12B, and compares the gate-source voltage $V_{GH2}$ of the second transistor T2 with the reference voltage $V_{ref}$ to generate a second comparison signal C2. In one embodiment, the second comparison circuit 13B may be a comparator or other similar components.

The second inter-lock circuit 14B is coupled to the first output terminal T1 via the first isolation circuit 16A. In addition, the second inter-lock circuit 14B is coupled to the second comparison circuit 13B via the third isolation circuit 16C, and is coupled to the first current amplifier circuit 17A via the second delay circuit 15B. In one embodiment, the first isolation circuit 16A, the second isolation circuit 16B and the third isolation circuit 16C may be photo couplers or other similar components.

The load L is coupled to the source of the first transistor 12A and the drain of the second transistor 12B. In one embodiment, the load L may be a free-wheeling diode or other similar components.

Figure 2A:
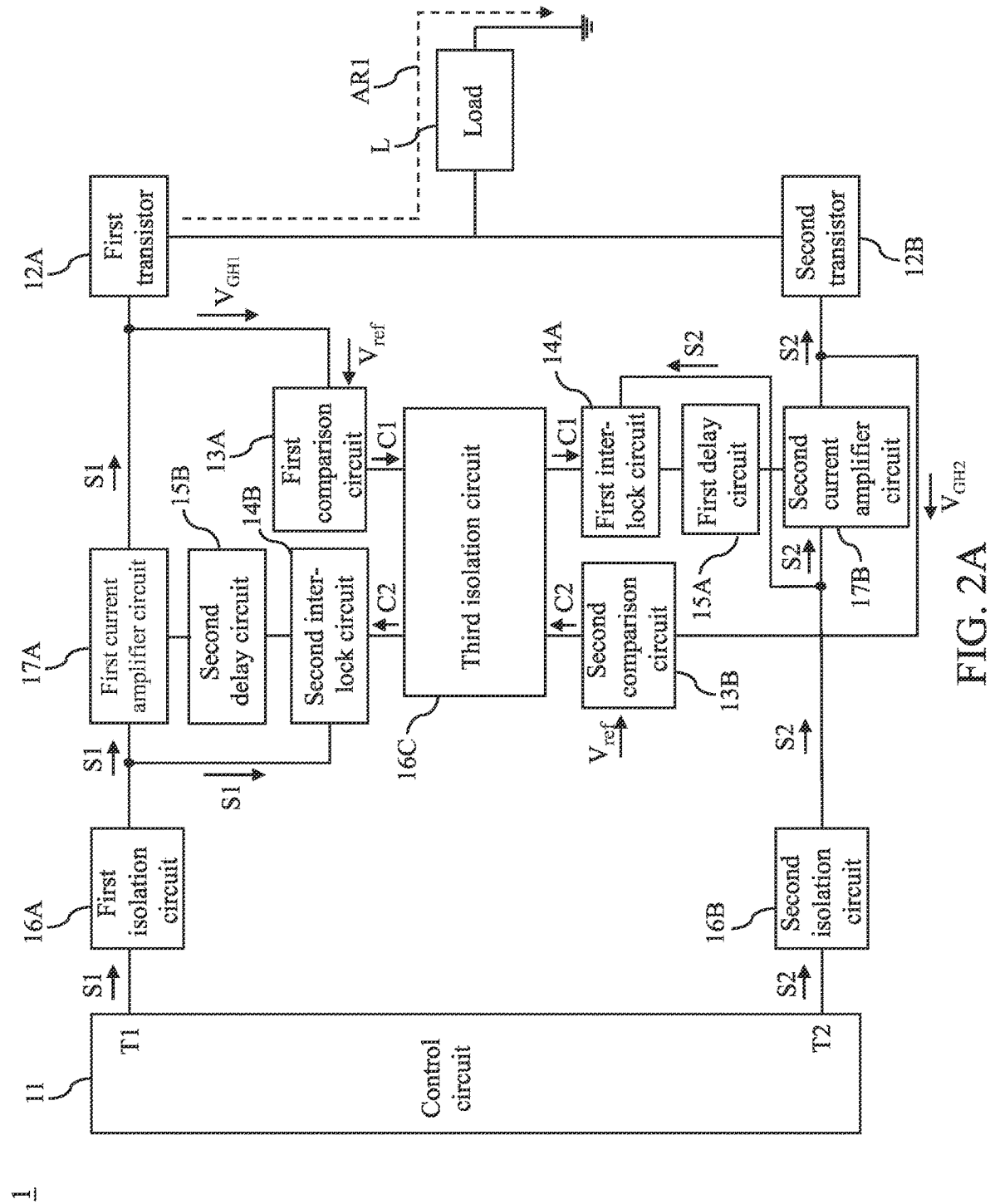
FIG. 2A is a first schematic view of the motor drive in operation in accordance with the first embodiment of the disclosure.
Figure 2B:
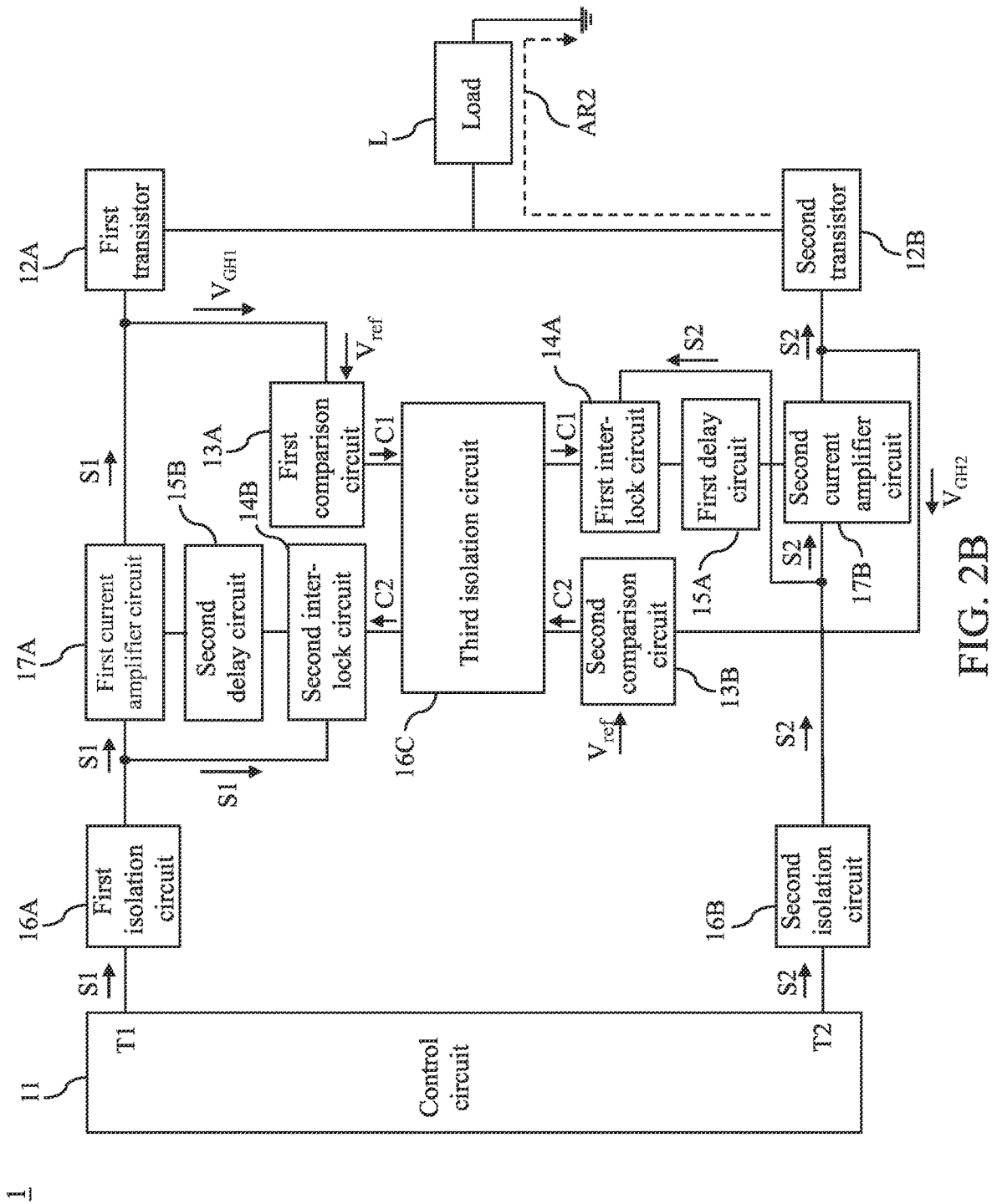
FIG. 2B is a second schematic view of the motor drive in operation in accordance with the first embodiment of the disclosure.

Please refer to FIG. 2A and FIG. 2B, which are a first schematic view and a second schematic view of the motor drive in operation in accordance with the first embodiment of the disclosure. As shown in FIG. 2A, when the first control signal S1 outputted by the first output terminal T1 of the control circuit 11 is in high level, the first transistor 12A is turned on to drive the load L. Meanwhile, the second control signal S2 outputted by the second output terminal T2 of the control circuit 11 is in low level and the second transistor 12B is turned off. In this case, the path of the current is as shown by the arrow AR1 of FIG. 2A.

As described above, the first comparison circuit 13A compares the gate-source voltage $V_{GH1}$ of the first transistor 12A with the reference voltage $V_{ref}$ to generate the first comparison signal C1. When the first control signal S1 is in high level, the gate-source voltage $V_{GH1}$ of the first transistor 12A is higher than the reference voltage $V_{ref}$. Therefore, the first comparison signal C1 is in the first level, which means that the first transistor 12A is in on state.

The first inter-lock circuit 14A receives the second control signal S2 and the first comparison signal C1, and determines whether to transmit the second control signal S2 to the gate of the second transistor 12B according to the second control signal S2 and the first comparison signal C1.

When the control circuit 11 is ready to turn off the first transistor 12A and turn on the second transistor 12B, the level of the first control signal S1 starts decreasing from high level to low level and the level of the second control signal S2 starts increasing from low level to high level. When the first control signal S1 starts decreasing but is still higher than the reference voltage $V_{ref}$, the first comparison signal C1 keeps being in the first level. At the moment, if the level of the second control signal S2 has increased to high level, the first inter-lock circuit 14A blocks the second control signal S2 from being transmitted to the gate of the second transistor 12B so as to prevent from the loss caused because the first transistor 12A and the second transistor 12B are turned on at the same time.

As shown in FIG. 2B, when the first control signal S1 decreases to be lower than the reference voltage $V_{ref}$, the gate-source voltage $V_{GH1}$ of the first transistor 12A is lower than the reference voltage $V_{ref}$. Therefore, the first comparison signal C1 is in the second level at the moment, which means the first transistor 12A is in off state. Meanwhile, if the level of the second control signal S2 has increased to high level, the first inter-lock circuit 14A allows the second control signal S2 to be transmitted to the gate of the second transistor 12B in order to turn on the second transistor 12B and drive the load L. In this case, the path of the current is as shown by the arrow AR2 of FIG. 2B. The first inter-lock circuit 14A controls the transmission of the second control signal S2 via the first delay circuit 15A, so the first delay circuit 15A can delay the transmission of the second control signal S2 to the gate of the second transistor 12B. Accordingly, the second transistor 12B will not be turned on prematurely.

Similarly, the second comparison circuit 13B compares the gate-source voltage $V_{GH2}$ of the second transistor 12B with the reference voltage $V_{ref}$ to generate the second comparison signal C2. When the second control signal S2 is in high level, the gate-source voltage $V_{GH2}$ of the second transistor 12B is higher than the reference voltage $V_{ref}$. Therefore, the second comparison signal C2 is in the first level, which means that the second transistor 12B is in on state.

The second inter-lock circuit 14B receives the first control signal S1 and the second comparison signal C2, and determines whether to transmit the first control signal S1 to the gate of the first transistor 12A according to the first control signal S1 and the second comparison signal C2.

When the control circuit 11 is ready to turn off the second transistor 12B and turn on the first transistor 12A, the level of the second control signal S2 starts decreasing from high level to low level and the level of the first control signal S1 starts increasing from low level to high level. When the second control signal S2 starts decreasing but is still higher than the reference voltage $V_{ref}$, the second comparison signal C2 keeps being in the first level. At the moment, if the level of the first control signal S1 has increased to high level, the second inter-lock circuit 14B blocks the first control signal S1 from being transmitted to the gate of the first transistor 12A so as to prevent from the loss caused because the first transistor 12A and the second transistor 12B are turned on at the same time.

As shown in FIG. 2A, when the second control signal S2 decreases to be lower than the reference voltage $V_{ref}$, the gate-source voltage $V_{GH2}$ of the second transistor 12B is lower than the reference voltage $V_{ref}$. Therefore, the second comparison signal C2 is in the second level at the moment, which means the second transistor 12B is in off state. Meanwhile, if the level of the first control signal S1 has increased to high level, the second inter-lock circuit 14B allows the first control signal S1 to be transmitted to the gate of the first transistor 12A in order to turn on the first transistor 12A and drive the load L. In this case, the path of the current is as shown by the arrow AR1 of FIG. 2A. The second inter-lock circuit 14B controls the transmission of the first control signal S1 via the second delay circuit 15B, so the second delay circuit 15B can delay the transmission of the first control signal S1 to the gate of the first transistor 12A. Accordingly, the first transistor 12A will not be turned on prematurely.

The aforementioned reference voltage $V_{ref}$ can be obtained from the specifications, provided by the transistor manufacturer, of the first transistor 12A and the second transistor 12B.

As set forth above, the motor drive 1 can determine the dead bands for switching the first transistor 12A and the second transistor 12B according to the variations of the gate-source voltage $V_{GH1}$ of the first transistor 12A and the gate-source voltage $V_{GH2}$ of the second transistor 12B. In this way, the motor drive 1 can reduce the dead bands as far as possible. Accordingly, the motor drive 1 can make sure that the dead bands are optimized, so the loss thereof can be effectively decreased.

Moreover, the motor drive 1 can further control the on/off state of the connection of the first transistor 12A and the second transistor 12B to the control circuit 11 via the first inter-lock circuit 14A and the second inter-lock circuit 14B. Thus, the motor drive 1 can more effectively avoid that the first transistor 12A and the second transistor 12B are transitorily short-circuited because being turned on at the same time in order to further reduce the loss thereof.

The embodiment just exemplifies the disclosure and is not intended to limit the scope of the disclosure. Any equivalent modification and variation according to the spirit of the disclosure is to be also included within the scope of the following claims and their equivalents.

Figure 3:
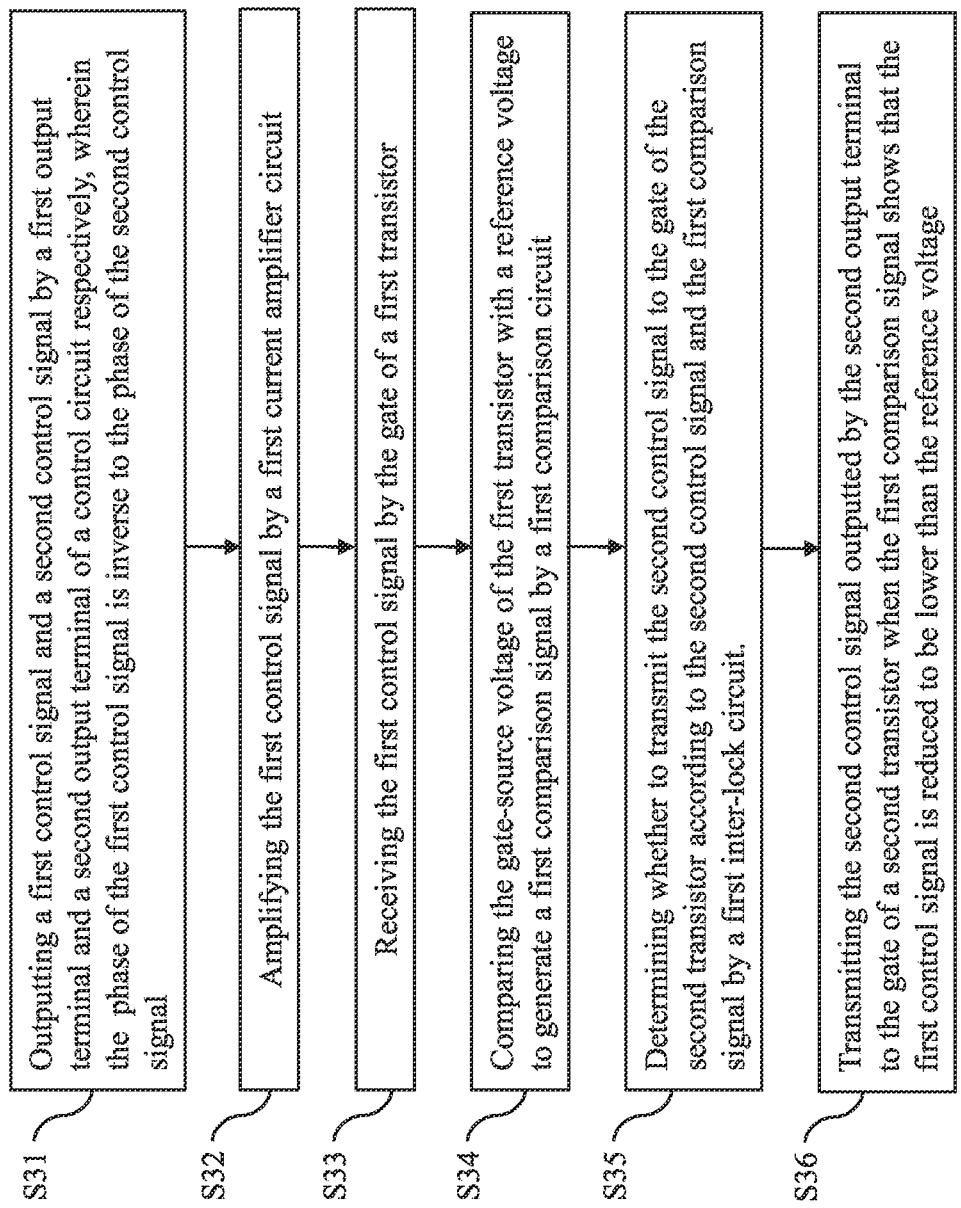
FIG. 3 is a flow chart of a method for reducing dead band of motor drive of the first embodiment in accordance with the disclosure.

Please refer to FIG. 3, which is a flow chart of a method for reducing dead band of motor drive of the first embodiment in accordance with the disclosure. The method for reducing dead band of the motor drive 1 of the embodiment includes the following steps:

Step S31: outputting a first control signal and a second control signal by a first output terminal and a second output terminal of a control circuit respectively, wherein the phase of the first control signal is inverse to the phase of the second control signal.

Step S32: amplifying the first control signal by a first current amplifier circuit.

Step S33: receiving the first control signal by the gate of a first transistor.

Step S34: comparing the gate-source voltage of the first transistor with a reference voltage to generate a first comparison signal by a first comparison circuit.

Step S35: determining whether to transmit the second control signal to the gate of the second transistor according to the second control signal and the first comparison signal by a first inter-lock circuit.

Step S36: transmitting the second control signal outputted by the second output terminal to the gate of a second transistor when the first comparison signal shows that the first control signal is reduced to be lower than the reference voltage.

It is worthy to point out that as the currently available motor drives cannot provide proper dead band, the loss thereof cannot be effectively reduced. On the contrary, according to one embodiment of the disclosure, the motor drive can compare the gate-source voltage of the first transistor with the reference voltage to generate a first comparison signal by the first comparison circuit, and turn on the connection between the second output terminal and the gate of the second transistor when the first comparison signal shows that the first control signal is lower than the reference voltage. The second transistor is also controlled in the same manner Thus, the motor drive can make sure that the motor drive has the optimized dead band so as to effectively reduce the loss thereof.

Besides, the currently available motor drives cannot provide proper dead band. Thus, if the dead band is too short, the switches of the currently available motor drives may be short-circuited for a short time, which would increase the loss of the switches. On the contrary, according to one embodiment of the disclosure, the motor drive can control the on/off state of the connection of the first transistor and the second transistor to the control circuit via the first inter-lock circuit and the second inter-lock circuit. Thus, the motor drive can more effectively avoid that the first transistor and the second transistor are turned on at the same time in order to prevent the circuit of the motor drive from malfunctioning and further reduce the loss thereof.

Further, as the currently available motor drives cannot provide proper dead band, the loss thereof cannot be effectively reduced, which would reduce the efficiency thereof. On the contrary, according to one embodiment of the disclosure, according to one embodiment of the disclosure, the motor drive can have optimized dead band, which can effectively reduce the loss thereof. Therefore, the efficiency of the motor drive can be greatly enhanced.

Moreover, as the currently available motor drives cannot provide proper dead band, the loss thereof cannot be effectively reduced, which would generate a lot of heat. For the reason, the currently available motor drives need to be installed with heat sinks with great cooling capacity, which may significantly increase the size of these motor drives. On the contrary, according to one embodiment of the disclosure, the motor drive can obtain optimized dead band, which can effectively reduce the loss thereof and decrease the heat generated in operation. Thus, the size of the heat sink of the motor drive can be reduced, so the motor drive can have compact structure and the applications thereof can be more comprehensive.

Furthermore, according to one embodiment of the disclosure, the motor drive can obtain optimized dead band by simple circuit design, so can achieve the desired technical effects without significantly increasing cost. Therefore, the motor drive can have high commercial value. As described above, the motor drive according to the embodiments of the disclosure can actually achieve great technical effects.

Figure 4:
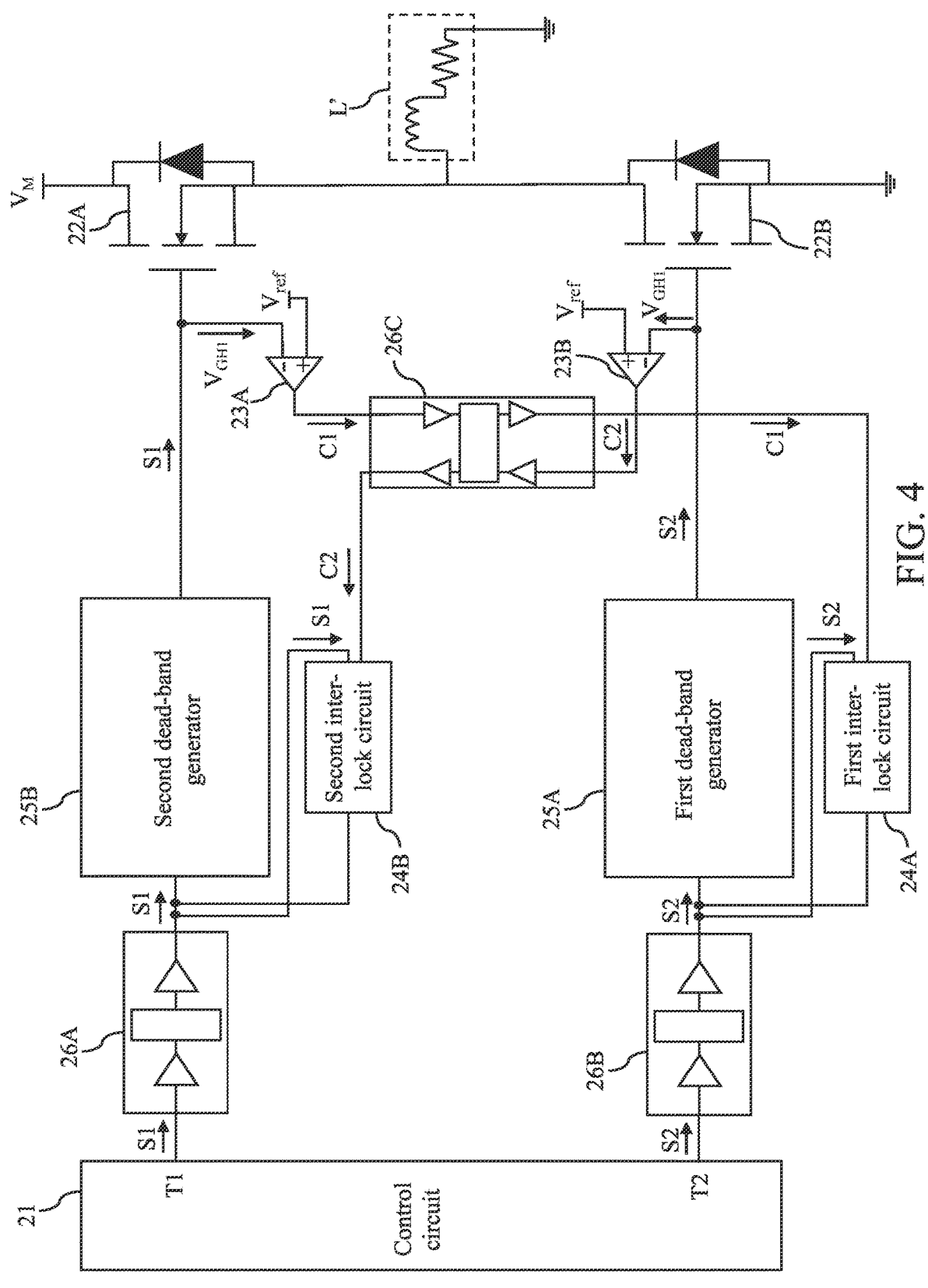
FIG. 4 is a circuit diagram of a motor drive in accordance with a second embodiment of the disclosure.

Please refer to FIG. 4, which is a circuit diagram of a motor drive in accordance with a second embodiment of the disclosure; this embodiment illustrates a circuit design for the motor drive 2. As shown in FIG. 4, the motor drive 2 includes a control circuit 21, a first metal-oxide-semiconductor field-effect transistor (MOSFET) 22A, a second MOSFET 22B, a first comparator 23A, a second comparator 23B, a first inter-lock circuit 24A, a second inter-lock circuit 24B, a first dead-band generator 25A, a second dead-band generator 25B, a first photo coupler 26A, a second photo coupler 26B and a third photo coupler 26C.

The control circuit 21 includes a first output terminal T1 and a second output terminal T1. The first output terminal T1 is coupled to the gate of the first MOSFET 22A via the first photo coupler 26A. The first output terminal T1 outputs a first control signal S1, and the first control signal S1 is transmitted to the gate of the first MOSFET 22A via the first photo coupler 26A. The second output terminal T2 is coupled to the gate of the second MOSFET 22B via the second photo coupler 26B. The second output terminal T2 outputs a second control signal S2 whose phase is inverse to the phase of the first control signal S1, and the second control signal S2 is transmitted to the gate of the second MOSFET 22B via the second photo coupler 26B.

The first comparator 23A is coupled to the gate of the first MOSFET 22A. The inverting input node of the first comparator 23A receives the gate-source voltage $V_{GH1}$ of the first MOSFET 22A and the non-inverting input node of the first MOSFET 22A receives a reference voltage $V_{ref}$ in order to compare the gate-source voltage Win of the first MOSFET 22A with the reference voltage $V_{ref}$ to generate a first comparison signal C1.

The first inter-lock circuit 24A is coupled to the second output terminal T2 via the second photo coupler 26B. Besides, the first inter-lock circuit 24A is further coupled to the first dead-band generator 25A.

The second comparator 23B is coupled to the gate of the second MOSFET 22B. The inverting input node of the second comparator 23B receives the gate-source voltage $V_{GH2}$ of the second MOSFET 22B and the non-inverting input node of the second MOSFET 22B receives the reference voltage $V_{ref}$ in order to compare the gate-source voltage $V_{GH2}$ of the second MOSFET 22B with the reference voltage $V_{ref}$ to generate a second comparison signal C2.

The second inter-lock circuit 24B is coupled to the first output terminal T1 via the first photo coupler 26A. Besides, the second inter-lock circuit 24B is coupled to the second comparator 23B via the third photo coupler 26C and is coupled to the second photo coupler 26B.

A free-wheeling diode (i.e. the load) L' is coupled to the source of the first MOSFET 22A and the drain of the second MOSFET 22B.

Figure 5A:
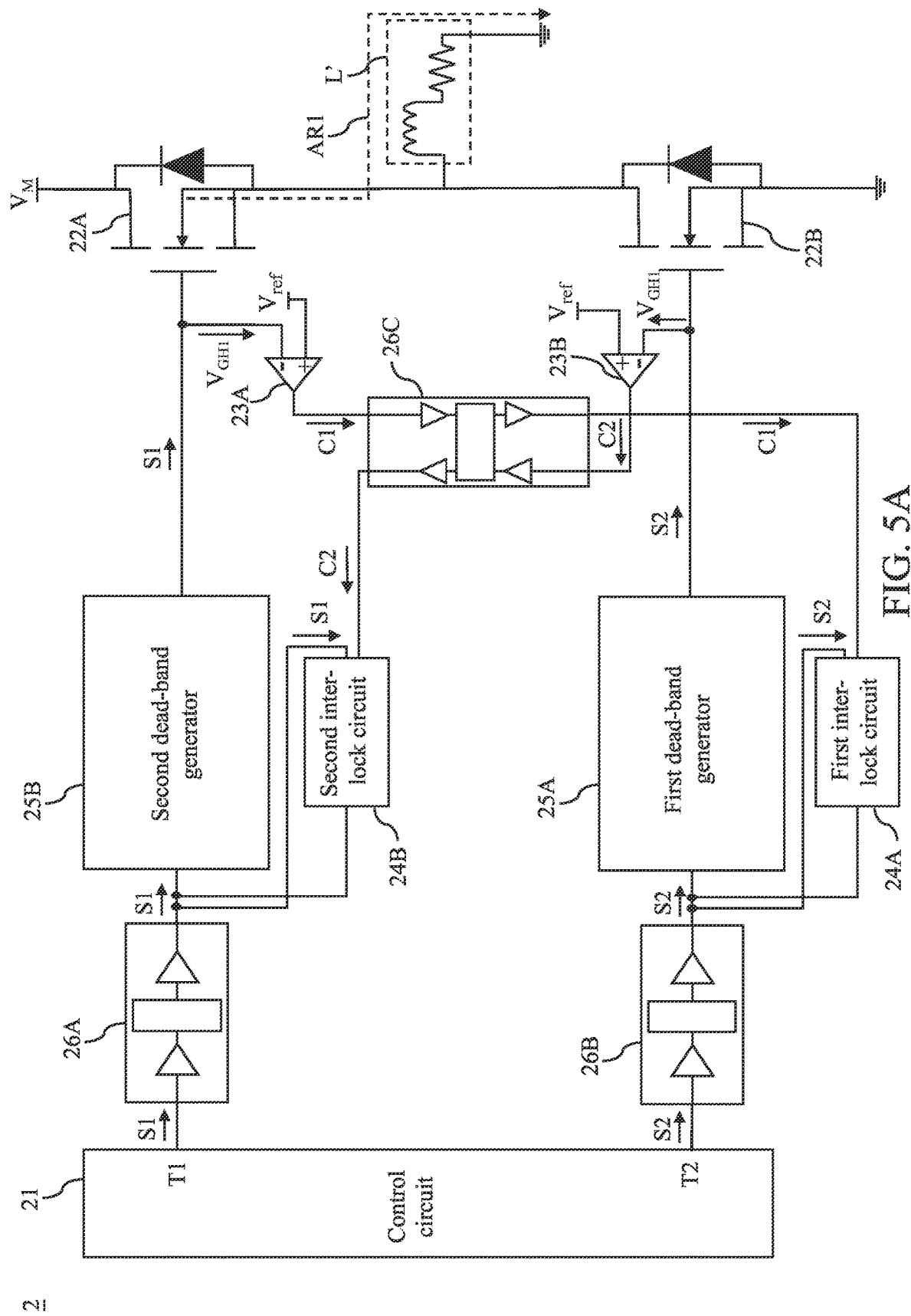
FIG. 5A is a first schematic view of the motor drive in operation in accordance with the second embodiment of the disclosure.
Figure 5B:
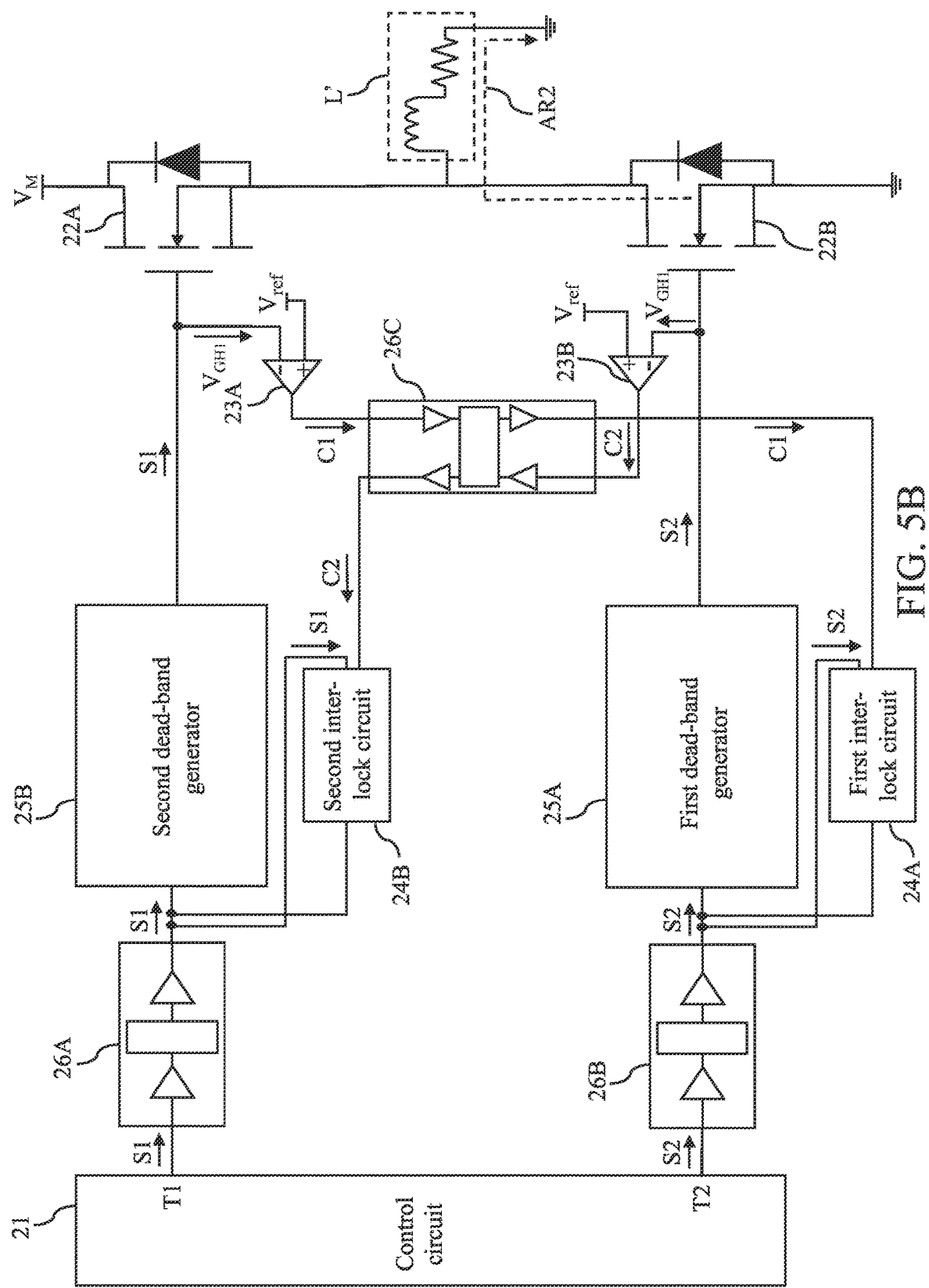
FIG. 5B is a second schematic view of the motor drive in operation in accordance with the second embodiment of the disclosure.

Please refer to FIG. 5A and FIG. 5B, which are a first schematic view and a second schematic view of the motor drive in operation in accordance with the second embodiment of the disclosure. As shown in FIG. 5A, when the first control signal S1 outputted by the first output terminal T1 of the control circuit 21 is in high level, the first MOSFET 22A is turned on to drive the free-wheeling diode L'. Meanwhile, the second control signal S2 outputted by the second output terminal T2 of the control circuit 21 is in low level and the second MOSFET 22B is turned off. In this case, the path of the current is as shown by the arrow AR1 of FIG. 5A.

Similarly, the first comparator 23A compares the gate-source voltage $V_{GH1}$ of the first MOSFET 22A with the reference voltage $V_{ref}$ to generate the first comparison signal C1. When the first control signal S1 is in high level, the gate-source voltage $V_{GH1}$ of the first MOSFET 22A is higher than the reference voltage $V_{ref}$. Therefore, the first comparison signal C1 is in low level, which means that the first MOSFET 22A is in on state.

The first inter-lock circuit 24A receives the second control signal S2 and the first comparison signal C1, and determines whether to transmit the second control signal S2 to the gate of the second MOSFET 22B according to the second control signal S2 and the first comparison signal C1.

When the control circuit 21 is ready to turn off the first MOSFET 22A and turn on the second MOSFET 22B, the level of the first control signal S1 starts decreasing from high level to low level and the level of the second control signal S2 starts increasing from low level to high level. When the first control signal S1 starts decreasing but is still higher than the reference voltage $V_{ref}$, the first comparison signal C1 keeps being in the low level. At the moment, if the level of the second control signal S2 has increased to high level, the first inter-lock circuit 24A blocks the second control signal S2 from being transmitted to the gate of the second MOSFET 22B so as to prevent from the loss caused because the first MOSFET 22A and the second MOSFET 22B are turned on at the same time.

As shown in FIG. 5B, when the first control signal S1 decreases to be lower than the reference voltage $V_{ref}$, the gate-source voltage $V_{GH1}$ of the first MOSFET 22A is lower than the reference voltage $V_{ref}$. Therefore, the first comparison signal C1 is in high level at the moment, which means the first MOSFET 22A is in off state. Meanwhile, if the level of the second control signal S2 has increased to high level, the first inter-lock circuit 24A allows the second control signal S2 to be transmitted to the gate of the second MOSFET 22B in order to turn on the second MOSFET 22B and drive the free-wheeling diode L'. In this case, the path of the current is as shown by the arrow AR2 of FIG. 5B. The first inter-lock circuit 24A controls the transmission of the second control signal S2 via the first dead-band generator 25A, so the first dead-band generator 25A can delay the transmission of the second control signal S2 to the gate of the second MOSFET 22B. Accordingly, the second MOSFET 22B will not be turned on prematurely.

Similarly, the second comparator 23B compares the gate-source voltage $V_{GH2}$ of the second MOSFET 22B with the reference voltage $V_{ref}$ to generate the second comparison signal C2. When the second control signal S2 is in high level, the gate-source voltage $V_{GH2}$ of the second MOSFET 22B is higher than the reference voltage $V_{ref}$. Therefore, the second comparison signal C2 is in low level, which means that the second MOSFET 22B is in on state.

The second inter-lock circuit 24B receives the first control signal S1 and the second comparison signal C2, and determines whether to transmit the first control signal S1 to the gate of the first MOSFET 22A according to the first control signal S1 and the second comparison signal C2.

When the control circuit 21 is ready to turn off the second MOSFET 22B and turn on the first MOSFET 22A, the level of the second control signal S2 starts decreasing from high level to low level and the level of the first control signal S1 starts increasing from low level to high level. When the second control signal S2 starts decreasing but is still higher than the reference voltage $V_{ref}$, the second comparison signal C2 keeps being in low level. At the moment, if the level of the first control signal S1 has increased to high level, the second inter-lock circuit 24B blocks the first control signal S1 from being transmitted to the gate of the first MOSFET 22A so as to prevent from the loss caused because the first MOSFET 22A and the second MOSFET 22B are turned on at the same time.

As shown in FIG. 5A, when the second control signal S2 decreases to be lower than the reference voltage $V_{ref}$, the gate-source voltage $V_{GH2}$ of the second MOSFET 22B is lower than the reference voltage $V_{ref}$. Therefore, the second comparison signal C2 is in high level at the moment, which means the second MOSFET 22B is in off state. Meanwhile, if the level of the first control signal S1 has increased to high level, the second inter-lock circuit 24B allows the first control signal S1 to be transmitted to the gate of the first MOSFET 22A in order to turn on the first MOSFET 22A and drive the free-wheeling diode L'. In this case, the path of the current is as shown by the arrow AR1 of FIG. 5A. The second inter-lock circuit 24B controls the transmission of the first control signal S1 via the second dead-band generator 25B, so the second dead-band generator 25B can delay the transmission of the first control signal S1 to the gate of the first MOSFET 22A. Accordingly, the first MOSFET 22A will not be turned on prematurely.

The embodiment just exemplifies the disclosure and is not intended to limit the scope of the disclosure. Any equivalent modification and variation according to the spirit of the disclosure is to be also included within the scope of the following claims and their equivalents.

To sum up, according to one embodiment of the disclosure, the motor drive can compare the gate-source voltage of the first transistor with the reference voltage to generate a first comparison signal by the first comparison circuit, and turn on the connection between the second output terminal and the gate of the second transistor when the first comparison signal shows that the first control signal is lower than the reference voltage. The second transistor is also controlled in the same manner Thus, the motor drive can make sure that the motor drive has the optimized dead band so as to effectively reduce the loss thereof.

Besides, according to one embodiment of the disclosure, the motor drive can control the on/off state of the connection of the first transistor and the second transistor to the control circuit via the first inter-lock circuit and the second inter-lock circuit. Thus, the motor drive can more effectively avoid that the first transistor and the second transistor are turned on at the same time in order to prevent the circuit of the motor drive from malfunctioning and further reduce the loss thereof.

Further, according to one embodiment of the disclosure, the motor drive can have optimized dead band, which can effectively reduce the loss thereof. Therefore, the efficiency of the motor drive can be greatly enhanced.

Moreover, according to one embodiment of the disclosure, the motor drive can obtain optimized dead band, which can effectively reduce the loss thereof and decrease the heat generated in operation. Thus, the size of the heat sink of the motor drive can be reduced, so the motor drive can have compact structure and the applications thereof can be more comprehensive.

Furthermore, according to one embodiment of the disclosure, the motor drive can obtain optimized dead band by simple circuit design, so can achieve the desired technical effects without significantly increasing cost. Therefore, the motor drive can have high commercial value.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A motor drive, comprising:
    a control circuit, comprising a first output terminal configured to output a first control signal and a second output terminal configured to output a second control signal, wherein a phase of the first control signal is inverse to a phase of the second control signal;
    a first transistor, configured to receive the first control signal via a gate thereof;
    a first comparison circuit, configured to compare a gate-source voltage of the first transistor with a reference voltage to generate a first comparison signal;
    a second transistor;
    wherein when the first comparison signal shows that the first control signal is reduced to be lower than the reference voltage, the second control signal outputted by the second output terminal is transmitted to a gate of the second transistor.

2. The motor drive of claim 1, further comprising a first inter-lock circuit coupled to the second output terminal and the first comparison circuit, wherein the first inter-lock circuit is configured to determine whether to transmit the second control signal to the gate of the second transistor according to the second control signal and the first comparison signal.

3. The motor drive of claim 2, further comprising a second current amplifier circuit coupled to the first inter-lock circuit, wherein the second output terminal is coupled to the gate of the second transistor via the second current amplifier circuit.

4. The motor drive of claim 3, further comprising a first delay circuit, wherein the first inter-lock circuit is coupled to the second current amplifier circuit via the first delay circuit.

5. The motor drive of claim 1, further comprising a second circuit coupled to the gate of the second transistor and configured to compare a gate-source voltage of the second transistor with the reference voltage to generate a second comparison signal.

6. The motor drive of claim 5, wherein when the second comparison signal shows that the second control signal is reduced to be lower than the reference voltage, the first control signal outputted by the first output terminal is transmitted to the gate of the first transistor.

7. The motor drive of claim 5, further comprising a second inter-lock circuit coupled to the first output terminal and the second comparison circuit, wherein the second inter-lock circuit is configured to determine whether to transmit the first control signal to the gate of the first transistor according to the first control signal and the second comparison signal.

8. The motor drive of claim 7, further comprising a first current amplifier circuit coupled to the second inter-lock circuit, wherein the first output terminal is coupled to the gate of the first transistor via the first current amplifier circuit.

9. The motor drive of claim 8, further comprising a second delay circuit, wherein the second inter-lock circuit is coupled to the first current amplifier circuit via the second delay circuit.

10. The motor drive of claim 1, wherein the first transistor and the second transistor are metal oxide semiconductor field effect transistors or insulated gate bipolar transistors.

11. The motor drive of claim 1, further comprising a first isolation circuit disposed between the gate of the first transistor and the first output terminal, and a second isolation circuit disposed between the gate of the second transistor and the second output terminal.

12. A method for reducing dead band of motor drive, comprising:
    outputting a first control signal and a second control signal by a first output terminal and a second output terminal of a control circuit respectively, wherein a phase of the first control signal is inverse to a phase of the second control signal;
    receiving the first control signal by a gate of a first transistor;

comparing a gate-source voltage of the first transistor with a reference voltage to generate a first comparison signal by a first comparison circuit; and transmitting the second control signal outputted by the second output terminal to a gate of a second transistor when the first comparison signal shows that the first control signal is reduced to be lower than the reference voltage.

13. The method for reducing dead band of motor drive of claim 12, further comprising:

determining whether to transmit the second control signal to the gate of the second transistor according to the second control signal and the first comparison signal by a first inter-lock circuit.

14. The method for reducing dead band of motor drive of claim 13, wherein a step of determining whether to transmit the second control signal to the gate of the second transistor according to the second control signal and the first comparison signal by the first inter-lock circuit further comprising:

delaying a transmission of the second control signal to the gate of the second transistor by a first delay circuit.

15. The method for reducing dead band of motor drive of claim 12, further comprising:

amplifying the first control signal by a first current amplifier circuit.

16. The method for reducing dead band of motor drive of claim 12, further comprising:

comparing a gate-source voltage of the second transistor with the reference voltage to generate a second comparison signal by a second comparison circuit.

17. The method for reducing dead band of motor drive of claim 16, further comprising:

transmitting the first control signal outputted by the first output terminal to the gate of the first transistor when the second comparison signal shows that the second control signal is reduced to be lower than the reference voltage.

18. The method for reducing dead band of motor drive of claim 16, further comprising:

determining whether to transmit the first control signal to the gate of the first transistor according to the first control signal and the second comparison signal by a second inter-lock circuit.

19. The method for reducing dead band of motor drive of claim 18, wherein a step of determining whether to transmit the first control signal to the gate of the first transistor according to the first control signal and the second comparison signal by the second inter-lock circuit delaying a transmission of the first control signal to the gate of the first transistor by a second delay circuit.

20. The method for reducing dead band of motor drive of claim 12, further comprising:

amplifying the second control signal by a second current amplifier circuit.

* * * * *